Patented Jan. 10, 1939

2,143,360

UNITED STATES PATENT OFFICE 2,143,360

FERMENTATION PROCESS FOR PRODUCING LACTIC ACID AND LACTATES

Haskell C. Needle, Chicago, Ill., assignor to American Maize-Products Company, a corporation of Maine No Drawing. Application August 26, 1937, Serial No. 161,028. Renewed December 3, 1938

4 Claims.  (Cl. 195—48)

My invention relates to processes for fermenting carbohydrate materials with lactobacilli to produce lactic acid and lactates such as calcium lactate and more particularly to such a process in which distiller's grains are used as the assimilable nutrient for the lactorbacilli to effect rapid fermentation action and production of pure white products.

Lactobaccili fermenting agents, such as for example, *Bacillus delbruckii*, will ferment carbohydrate materials particularly the well-known sugars such as dextrose, levulose, maltose, sucrose and also dextrine, but the rate of fermentation and the color of the resulting product vary widely. These variations depend largely upon the type of assimilable material used as the nutrient or food media for the fermenting lactobacilli. Heretofore various media, containing proteins, salts and carbohydrates in an assimilable form have been employed, but their commercial use has been characterized by certain disadvantages, such as extended fermentation time, and undesirable color formation in the mash and in the final product resulting from the usual heat sterilization treatment. In general, the fermentation time required in the prior art processes is from ten to fifteen days, the assimilable material being slowly used up with the production of lactic acid. The undesired color formed by the prolonged fermentation and sterilization treatments of the prior art processes necessitates treating the fermentation products with strong decolorizing agents or with large amounts of filtering agents such as activated char. These necessary refining steps involve appreciable expense.

An object of my invention is to provide an improved process for the production of lactic acid and lactates by the fermentation of carbohydrates with lactobacilli, which process has a relatively fast fermentation rate, will not produce undesirable colors in the final product, and employs an efficient inexpensive protein material as the assimilable medium for the bacilli.

I have discovered that lactic acid and lactates, particularly calcium lactate, free of undesirable color, may be produced with high efficiency by proper fermentation of a suitable carbohydrate material using distiller's grains as the assimilable medium or nutrient for the bacilli. In its broad aspects the process of my invention comprises fermenting carbohydrate material with a suitable lactobacillus in the presence of distiller's grains as the assimilable protein nutrient. The lactic acid and calcium lactate produced by this process have exceptional purity, no undesired color and are produced relatively inexpensively.

One of the important features of my process is that sterilization, at the usual temperatures of about 190° F. to 212° F., of the fermentation mash containing the distiller's grains as nutrient will not coagulate the albumen content of this nutrient and therefore its nitrogen content is maintained assimilable. Likewise, in all other respects the distiller's grains are not incapacitated or adversely affected by the heat sterilization. This desirable feature is not possessed by a number of the nutrients heretofore proposed. Moreover, the suitability of distiller's grains as fermentation nutrients has not heretofore been recognized. In fact, the prior investigators have considered these materials of little or no value for anything except animal feed. It has always been expected from the very nature of these materials that they would impart color and highly contaminate the fermentation mash. I have discovered however, that this is not true and on the contrary that fermentation mashes employing distiller's grains as nutrients can be converted directly into lactic acid, calcium lactate and other lactates without the necessity of crystallizing the products, to obtain desired purity and color. This is in contrast to various of the prior art nutrients such as for example, molasses, corn germ meal cake, peptones, glue, and various soluble nitrogen compounds, such as hexamethylene tetramine, urea, asparagine. These nutrients introduce undesired soluble substances into the fermented liquors. They also give rise to rapid color development in the warm fermentation liquors, which colors can not be removed economically. The speed of fermentation with these nutrients is relatively slow and consequently butyric acid fermentation and other contaminating fermentations proceed to a considerable extent. This prolonged fermentation at a temperature of about 120° F. also results in caramelization of the sugars giving the fermented liquors an undesirable dark color. In view of the various contaminations thus arising it has been the practice heretofore to crystallize calcium lactate out of the fermentation liquors in order to secure therefrom pure colorless calcium lactate or lactic acid.

My process may be briefly described as comprising the steps of fermentaing a suitable carbohydrate material with a suitable lactobacillus in the presence of calcium carbonate to form calcium lactate and lactic acid, if desired, while using distiller's grains as nutrient for the fermenting bacillus, neutralizing the fermentation liquors, filtering to remove proteins and heavy metals, acidifying and decolorizing the filtrate to produce a water white calcium lactate solution and either rapidly drying this solution to produce the desired high purity white solid calcium lactate or treating the calcium lactate solution with sulphuric acid to form lactic acid and filtering and decolorizing the lactic acid solution to produce the desired pure white lactic acid. In accordance with this process all of the disadvantages and limitations characteristic of prior processes have been minimized and I have prepared directly from the fermentation liquors a pure colorless calcium lactate and lactic acid.

The carbohydrate materials that may be used satisfactorily in this invention comprise all such materials that are fermentable to form lactic acid and will not give rise to any undesirable color or impurity in the final calcium lactate and lactic acid products. The most common example of suitable carbohydrate materials is sugar produced by acid conversion of corn starch.

The lactobacilli fermenting agents that may be used in this invention include all such bacilli that will not give rise to any undesired color or impurity in the final product and will effect fermentation of the carbohydrate material into lactic acid at a temperature at which any contaminating organisms will be incapacitated. This temperature is normally about 120° F. Examples of bacilli that I have found to be particularly useful are *Lactobacillus delbruckii, leichmanni* and variants thereof.

The distiller's grains that may be used as nutrient in the fermentation process for producing the desired white calcium lactate and lactic acid in accordance with this invention include bourbon, rye, and corn, the name being derived from the cereal product used as basis for the fermentation. Distiller's grains is the slurry that remains after completion of the fermentation step in the manufacture of alcoholic liquors and contains dead yeast cells, starches, proteins from the materials used in making up the fermentation batch, and salts, depending upon the particular batch formula used. This slurry may be dried by means of a spray, or kiln drier and is usually sold for cattle feed. The grains will vary considerably depending upon the type of fermentation mash from which they are derived. The greatest value of the grains lies in the dead yeast cells present, which I believe to be one of the best sources of nutrients for microorganisms. Distiller's grains include bourbon, rye, wheat, etc.

According to one specific but non-limiting example of my invention, pure white calcium lactate or lactic acid may be produced as follows:

A mash is made up consisting of: 200 pounds of distiller's grains, 6600 pounds of sugar (dextrose) and 4600 pounds of calcium carbonate with 50 pounds of diammonium acid phosphate added as an accelerator. Water is added to make 7000 gallons. The distiller's grains are sterilized by making a suspension of the 200 pounds of nutrient in 300 gallons of water and raising the temperature of this suspension, in a container separate from the fermentation tub, to 212° F. and maintaining this temperature for one to two hours. The sterilized material is then dropped into the main fermentable batch. Sterilizing the nutrient separate from the main batch is to be preferred as less color is thus transmitted to the fermenting mash. However, sterilization may be effected by raising the temperature of the entire batch in the fermentation tub to 212° F. and maintaining this temperature for one to two hours. Subsequntly the temperature is lowered to 120° F. and inoculating with 300 gallons of a 24 hour culture of the organism.

The mash is allowed to ferment until no sugar is shown to be present or until the liquor contains less than 0.1% reducing substances. The fermentation is carried out at 120° F. and takes from 5 to 7 days. It effects conversion of the sugar into lactic acid which is converted, as fast as it is formed, into calcium lactate by reaction with the calcium carbonate present.

The fermented calcium lactate liquor is then heated to 180° F. and maintained at that temperature for sufficient time to kill all living organisms. Lime in amount of 100 to 200 pounds added to the liquor to give it a pH of about 11.0 and the liquor filtered while hot to remove the proteins and heavy metals as insoluble hydroxides. The mash is then filtered and the resulting calcium lactate is acidified to a pH of 6 to 7 with lactic acid. This slight acidity helps to prevent undesirable color formation and aids in volatilization, during subsequent steps, any small amount of other organic acids that might be present. The calcium lactate liquor is then decolorized to a water white solution with vegetable carbon and filtered. If it is desired to produce lactic acid the filtered calcium lactate solution is treated with sulphuric acid and filtered to remove the precipitated calcium sulphate. The filtrate is then treated with vegetable carbon, and after filtration the resulting clear lactic acid is evaporated to the desired acid strength.

If it is desired to obtaina solid calcium lactate instead of lactic acid, the above mentioned water white solution of calcium lactate is run into a supply tank from where it flows by gravity to a leveling pan which maintains a constant level in flash boiler. The liquor at a Baumé of 6° to 7° is fed from the leveling pan into the flash boiler which is so constructed that a large thin surface of the liquor is exposed to the heating surface. Accordingly, the concentration of the liquor to a Baumé of 20° to 21° is effected very rapidly without allowing any appreciable formation of color. This heavy liquor is then sprayed into a spray drier where the temperature of the incoming air and gases is around 450° F. Here the liquor is converted into a powder the temperature of which is carefully maintained below the decomposition temperature to avoid discoloration. The powder is then carried into a cyclone where relatively fine and coarse particles of the powder are separated. The calcium lactate powder of desired fineness is then barreled.

Instead of drying the calcium lactate liquor in a spray drier as described above, it may be dried in a drum drier or in any other suitable type of drier wherein the drying operation is carried out with sufficient rapidity to avoid any discoloration of the final calcium lactate product. The calcium lactate powder resulting from the above described processes and rapid drying is very light in color and free of all contaminating volatile substances. It is made up of small non-crystalline, glassy fragments.

If desired the calcium lactate may be recovered from the fermentation liquors as a crystalline powder. In such cases the heat sterilized fermented liquors are treated with lime and the proteins and insoluble, metallic hydroxides filtered off as before. The liquors are acidified to a pH of 4.0 to 5.0 and decolorized to a water white solution with vegetable carbon. The liquor is then concentrated in a vacuum pan to a sufficient strength so that on standing crystallization occurs. The product is then filtered from the mother liquor, washed, and dried.

It is to be understood that various modifications and changes may be made in the materials and processes described hereinabove without departing from the scope of my invention. Some of the novel features of this invention are defined in the appended claims.

I claim:

1. In a process for the production of lactic acid and lactates by fermentation of a converted starch material with a lactic acid bacillus, the step which comprises effecting said fermentation in the presence of distillers' grains, which supply assimilable protein nutrient for the bacillus, said grains adding no undesired color to the fermented product and effecting sufficient rapid fermentation to prevent formation of color and undesired substances.

2. In a process for the production of lactic acid and lactates by fermentation of a converted starch mash with a lactic acid bacillus, the step which comprises carrying out said fermentation in the presence of a protein nutrient assimilable by said bacillus and selected from the group of distillers' grains consisting of bourbon, rye, corn and wheat.

3. A process for the production of lactic acid comprising fermenting sugar with a lactic acid bacillus selected from the group consisting of *Lactobacillus delbruckii, leichmanni* and variants thereof, and using distillers' grains as assimilable protein nutrient for said bacillus, whereby a substantially pure and colorless lactic acid is produced rapidly without recrystallization of the fermentation liquors.

4. A process of preparing substantially pure white calcium lactate comprising fermenting a converted starch with *Lactobacillus delbruckii*, using distiller's grains, which are non-coagulable or otherwise adversely affected by sterilization temperatures, as the assimilable protein nutrient for the bacillus and using calcium carbonate to neutralize the lactic acid formed by fermentation of said carbohydrate and to form calcium lactate therefrom, neutralizing the calcium lactate liquor and filtering to remove foreign substances, acidifying the calcium lactate liquor with lactic acid, decolorizing said liquor and rapidly drying to produce a solid, white, calcium lactate.

HASKELL C. NEEDLE.